United States Patent

[11] 3,556,304

[72] Inventors Ronald Thomas Collard;
Phillip Brian Wright, Dagenham Dock, England
[21] Appl. No. 760,589
[22] Filed Sept. 18, 1968
[45] Patented Jan. 19, 1971
[73] Assignee Porous Plastics Limited
Dagenham Dock, Essex, England

[54] PLASTIC FILTER CANDLE
5 Claims, 4 Drawing Figs.

[52] U.S. Cl. .................................................. 210/489, 210/496
[51] Int. Cl. .................................................. B01d 39/16
[50] Field of Search .......................................... 210/489, 490, 491, 333, 323, 321, 496, 499, 507, 506, 510, 315

[56] References Cited
UNITED STATES PATENTS
2,711,828  6/1955  Webb et al. ................. 210/489
3,156,645  11/1964  Chapin et al. ............... 210/321X
3,441,143  4/1969  Kuplaty ..................... 210/496X
3,455,459  7/1969  Troy ........................ 210/489X FOREIGN PATENTS
246,461  3/1963  Australia .................... 210/323
154,850  6/1938  Austria ..................... 210/315
943,642  12/1963  Great Britain ............... 210/323

Primary Examiner—Frank A. Spear, Jr.
Attorney—Watson, Cole, Grindle & Watson

ABSTRACT: A filter which consists of a foraminous tubular spacer made of two layers of integrally extruded filaments with one end closed with a welded-on cap and the other end provided with a flange and outlet aperture. The interior of the spacer is occupied by a reinforcing tubular core of sintered coarse-grained polymer and a tubular porous polymer filter septum is releasably secured over the spacer enabling it to be removed and replaced by a fresh filter septum when necessary.

PATENTED JAN 19 1971

INVENTORS,
RONALD THOMAS COLLARD
PHILIP BRIAN WRIGHT
BY Watson, Cole, Grindle & Watson
ATTORNEYS

PATENTED JAN 19 1971

INVENTORS,
RONALD THOMAS COLLARD
PHILIP BRIAN WRIGHT
BY Watson, Cole, Grindle & Watson
ATTORNEYS

PLASTIC FILTER CANDLE

This invention relates to filters and is concerned with reinforcing member that backs up the septum at which the filtering is actually performed.

According to the present invention, a filter which includes a tubular filter septum of porous synthetic polymer material surrounding a reinforcing tubular core of sintered coarse-grained synthetic polymer material is characterized in that a foraminous tubular spacer, formed by a reticulated mesh of filaments of synthetic polymer material, surrounds the reinforcing core and is itself surrounded by the filter septum which is separate from but fits closely about the spacer.

It will be appreciated that the cross section of the filter does not have to be a circle.

The spacer may be formed by extruding two layers of filaments with the filaments of one layer crossing those of another layer at an angle, intersecting filaments being merged or welded together where they meet or intersect. Such a reticulated mesh may be formed by extrusion from a row of orifices whereof each orifice is formed partly in one and partly in the other of two surfaces which slide one over the other. Thus at one moment when the two parts of an orifice are in register they form in effect a single orifice so that a filament of one layer and a filament of the other are extruded integrally with one another as a single filament. Thereafter as the two halves of the orifice slide away from one another a filament of one layer and a filament of the other layer separate and are extruded as separate filaments until each half orifice of one layer meets and registers with a different half orifice of the other layer, so as to form a reticulated structure. Such a material is sold under the trademark NETLON.

The invention may be put into practice in various ways but one specific embodiment will be described by way of example, with reference to the accompanying drawings in which.

In the embodiment described the invention is applied to filters of the type commonly used in conjunction with swimming pools and comprising a number of substantially rigid tubular septa 10 formed of porous high-density polyethylene known under the trademark VYON. Such a septum, often referred to as a filter candle, may be subjected to differential pressures of the order of 25 pounds per square inch or even up to 50 or 60 pounds per square inch in the case of a swimming pool filter. Such pressures are liable to cause cracking or collapse of the filter candle and accordingly various proposals have been made for providing a reinforcing core within the filter candle.

The difficulty is to provide adequate support for the filter candle without blocking off a substantial area and thereby lowering the filtering capacity. If the core engages the inner surface of the candle over a number of small areas widely spaced apart it may fail to prevent collapse, whereas if it engages the surface of the candle over large areas it unduly reduces the capacity of the filter.

Figure 2:
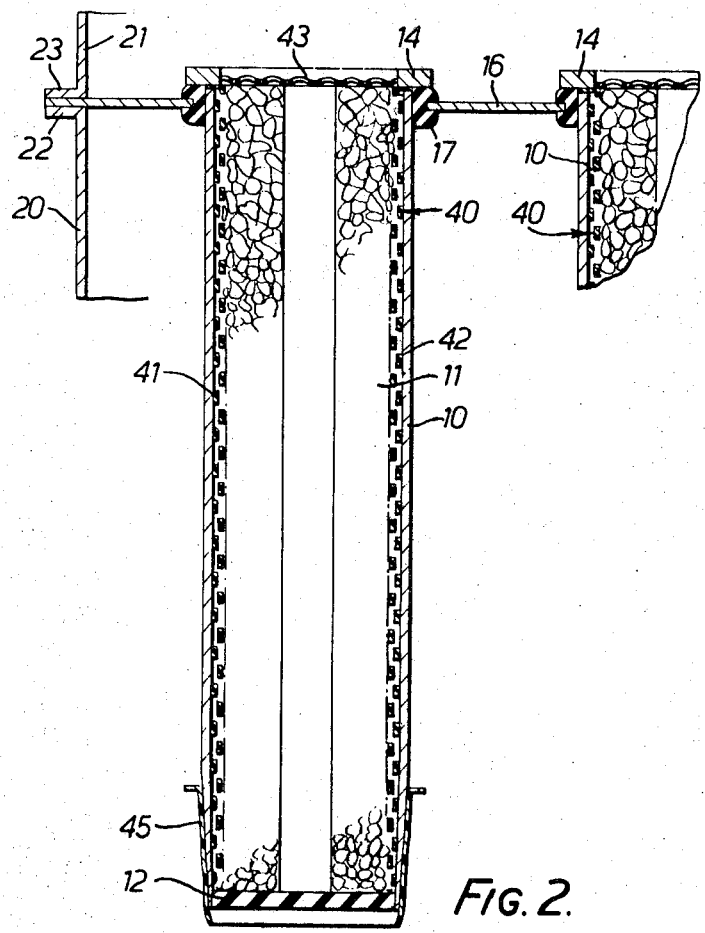
FIG. 2 is an enlarged view of part of FIG. 1 showing the details of one filter.

In applying the present invention, as indicated in FIG. 2, each filter candle 10 is provided with a reinforcing core 11 formed by sintering coarse-grains of polyethylene. Such grains, having a linear dimension of the order of one-eighth inch may even be a byproduct of little or no value.

The core is formed on a coaxial supporting mandrel by packing the polyethylene chips into a mould, for example in the form of an iron tube, together with the mandrel, and heating the mould so as to sinter the plastic material. The core is then removed from the mold and from the mandrel. The mandrel may be a solid rod or a tube.

The tubular inner core in the form of a thick walled hollow cylinder is surrounded by a tubular outer core or spacer 40 formed by a reticulated mesh of filaments of a plastics material. This may be of a known seamless extruded form made by extruding a thermoplastic synthetic material from a ring of extrusion orifices each of which is formed partly in one and partly in the other of two surfaces which slide over one another, one being afforded by an inner member fitting closely within an outer member affording the other surface. The two members are rotated in opposite directions so that at one moment a groove or half orifice in one is in register with a groove or half orifice in the other so as virtually to form a single extrusion orifice from which a single integral filament issues. A moment later the two grooves or half orifices slide away from one another so as to produce two separate filaments. Then a groove or half orifice of one member comes into register with a different groove of half orifice of the other member so as to produce an integral filament. The result is a reticulated structure made up of an outer layer 41 of filaments lying along a coarse right-hand helix viewed from the flange end and an inner layer 42 of filaments lying along a coarse left-hand helix also viewed from the flange end, the filaments of the two layers being merged or welded together (in the sense of being actually formed integrally with one another) at the points at which they intersect. Preferably the individual filaments are about 1 mm. in diameter and are spaced about 2.5 mm. apart in each layer for a tube about 3.3 cm. external diameter and about 14 cm. long.

Figure 3:
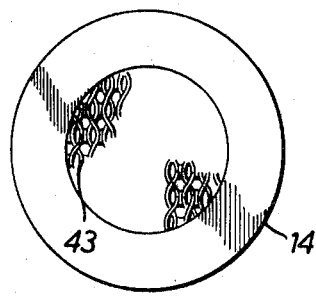
FIG. 3 is a plan view of the flange end of a filter shown in FIG. 2.
Figure 4:
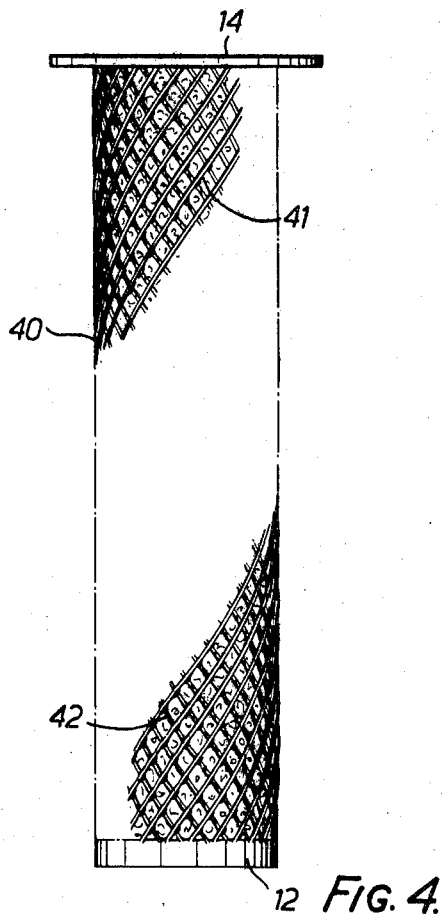
FIG. 4 is a perspective side elevation with the filter septum removed showing the form of the spacer.

One end of the spacer is provided with a disc 43 of another form of the reticulated mesh of filaments of a plastics material (se FIG. 3). This is formed is a manner analogous to the tubular net but employing two straight rows of extrusion orifices formed as grooves in a pair of flat surfaces which slide longitudinally in relation to one another. These are reciprocated in opposite directions so that each layer of filaments consists of a number of parallel sinuous lines each of which touches or intersects at least two lines of the other layer.

Both these reticulated materials are commercially available under the trademark NETLON.

The spacer of the filter candle is completed by a disc 12 of impervious plastics material secured to one end of it by welding or by adhesive to close that end, and a flat ring or annular flange 14 at the opposite end also secured to it by welding or by adhesive having in it a hole of approximately the diameter of the reticulated disc 43. The spacer and reinforcing core provide the permanent part of the filter and are assembled as follows. The cap or disc 12 is welded to the end of the spacer 40 the reinforcing core 11 is slid into the spacer 40 and the reticulated disc 43 and the flange 14 are welded to the other or top end of the spacer 40.

The filter septum itself is formed of porous high-density polyethylene having a pore size in the range 50—130 microns preferably 50—100 microns and particularly in the order of 60—90 microns. It consists of a seamed tube which fits round the reticulated tubular spacer. The wall thickness of the tube is about 1 mm. and the tube is self-supporting. At the end which will be closed the septum is provided with a plastics ring 45 which slightly constricts it so as to make a close fit round the end of the spacer and the reinforcing core and produce the seal with it as shown in FIG. 2.

The pore sizes referred to above are as measured by the method described in British Standard Specifications No. 1752: 1963, using n-propyl alcohol and is a measure related to the constrictions between pores.

The porous material of the filter septum is formed by sintering powered high-density polyethylene. One particular such material which has been found suitable is 0.040" thick, has a permeability of 50—110 cubic ft./min./sq.ft. air at pressure of 1" static water guage, a density of 0.4 to 0.6 grams/cc., and a pore size in the range 60—90 microns.

Desirably the septum has an ultimate tensile strength of 20—35 kg./cm.$^2$ or more.

An example of such a material is that sold under the trade name VYON. Such a material is formed by spreading an even layer of Ziegler high-density polyethylene powder on a smooth metal surface and then placing the smooth metal surface and the layer in a suitably heated oven to cause the particles to sinter. The surface of the resultant sintered sheet which was in contact with the smooth metal surface is smoother than the other face and it is this smoother face which is arranged to be on the outside of the tubular septum.

The sheet is then cut to size appropriate to the candle's dimensions and wrapped round into a tube and the edges welded together.

The reinforcing core 11 and spacer 40 provide reinforcement evenly distributed over the whole of the internal surface of the candle 10 without interfering unduly with the flow through the septum. The outer individual strands 41 of the spacer undulate slightly and thus it is only when the pressure difference across the septum 10 is substantial that the septum interior of the septum comes fully into contact with the outer individual strands 41 of the spacer 40.

Figure 1:
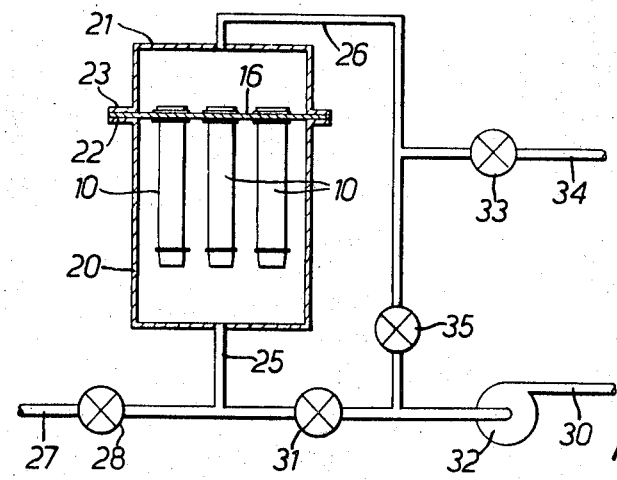
FIG. 1 is a diagram of a filter assembly employing filters in accordance with the invention.

FIG. 1 shows a filter assembly in which a number of filter candles 10 in accordance with the present invention are assembled in a corresponding number of holes in a header plate 16 each hole being occupied by a rubber grommet 17 engaging the underside of the flange 14, and having a groove to receive the margin of the hole in the header plate 16. For example the header plate may be circular and may contain a central candle with a ring of six or eight candles surrounding it.

The candles are mounted in a casing 20 having a cover 21 by gripping the margin of the header plate 16 between a flange 22 afforded by the casing and a flange 23 afforded by the cover, these flanges being secured together by suitably bolts (not shown). As indicated in FIG. 1 the casing is provided with an inlet pipe 25 at the bottom and an outlet pipe 26 at the top. The inlet pipe 25 communicates with a drain 27 through a valve 28 and with an inlet 30 through a valve 31 and a pump 32. The outlet pipe 26 communicates through a valve 33 with an outlet 34 and through a valve 35 with the delivery of the pump 32.

The filter may be employed in the customary manner. Thus, the candle, which has a pore size of the order of 60—90 microns, is employed in conjunction with a filter aid comprising a diatomaceous porous earth such as Kieselguhr, which may have a particle size of the order of 20 microns and a pore size of the order of 2 microns. The particular type of septum referred to tends to form a particularly fine uniform layer of the filter aid. From time to time such a filter becomes clogged with impurities and must be renewed by reversing the flow through it so as to remove the filter aid which is then replaced by new filter aid material. Prior to such reversal the pressure drop across the filter septum tends to rise to a maximum and it is in these conditions that the greatest danger of collapse of the septum normally arises.

Accordingly for normal operation the valves 28 and 35 are closed and the valves 31 and 33 are open so that water is pumped from the inlet 30 through the inlet pipe 25 to the casing 20, whence it flows inwards through the filter candles and out through the outlet pipe 26 past the valve 33 to the outlet 34. When it is required to clean the filters the valves 31 and 33 are closed and the valves 28 and 35 are opened so that water will be pumped from the inlet through the valve 35 to the outlet pipe 26 so as to flow outwards through the filters carrying with it the filter aid through the inlet pipe 25 and the valve 28 to the drain 27.

The use of the spacer in accordance with the invention enables the filter septum to be easily slid off for replacement.

The spacer also provides a convenient and easy anchorage for the end cap and the flange.

By employing a coarse-grained sintered plastic core it is possible not only virtually to eliminate danger of collapse but also to enable a thinner septum to be employed. The use of a sintered core formed from granules which are themselves microporous, still further reduces the resistance to flow, and in addition results in a more even distribution of any filter aid which may be used such as Kieselguhr on the outer surface of the septum.

We claim:
1. A filter including a tubular filter septum of porous synthetic polymer material surrounding a reinforcing tubular core comprising coarse grains of synthetic polymer material sintered together, a foraminous tubular spacer formed by a reticulated mesh of filaments of synthetic polymer material surrounding the reinforcing core, said spacer being surrounded by said filter septum which is separate from but fits closely about said spacer, and said filter septum being a self-supporting tube of sintered high-density polyethylene.

2. A filter as claimed in claim 1 in which said reticulated mesh of filaments is formed by extruding two layers of filaments with the filaments of one layer crossing those of another layer at an angle, intersecting filaments being adhered together where they touch.

3. A filter as claimed in claim 1 in which the filter septum has a pore size in the range 50 to 130 microns as measured by the method described in British Standard Specification No. 1752:1963, namely measuring the air pressure P required to force the first air bubble through a sheet of the material when completely saturated with n-propanol and determining the pore size $d$ from the equation $$d = \frac{30\gamma}{P}$$

where $\gamma$ is the surface tension of n-propanol in dyw./cm. at the temperature of the test and P is in mm. Hg.

4. A filter as claimed in claim 1 in which the filter septum has a pore size in the range 60 to 90 microns as measured by the method described in British Standard Specification No. 1752:1963, namely measuring the air pressure P required to force the first air bubble through a sheet of the material when completely saturated with n-propanol and determining the pore size $d$ from the equation $$d = \frac{30\gamma}{P}$$

where $\gamma$ is the surface tension of n-propanol in dyn./cm. at the temperature of the test and P is in mm. Hg. and in which the filter septum is about .1 mm. thick, the reinforcing core being formed of grains of polyethylene about one-eighth inches in diameter and the spacer having individual filaments in the outer layer about 1 mm. thick and about 2.5 mm. apart.

5. A filter including a tubular filter septum of porous synthetic polymer material surrounding a reinforcing tubular core comprising coarse grains of synthetic polymer material sintered together, a foraminous tubular spacer formed by a reticulated mesh of filaments of synthetic polymer material surrounding the reinforcing core, said spacer being surrounded by said filter septum which is separate from but fits closely about said spacer, said spacer being formed by extruding two layers of filaments with the filaments of one layer crossing those of another layer at an angle, intersecting filaments being adhered together where they touch, and said filter septum being a self-supporting tube of sintered high density polyethylene.